3,075,018
TRIS-[PENTAFLUOROPHENYL]-PHOSPHINE AND METHOD OF MAKING THE SAME
Walter J. Pummer, Rockville, Md., and Leo A. Wall, Washington, D.C., assignors to the United States of America as represented by the Secretary of the Navy
No Drawing. Original application May 3, 1960, Ser. No. 26,660, now Patent No. 3,046,313, dated July 24, 1962. Divided and this application June 26, 1961, Ser. No. 126,453
1 Claim. (Cl. 260—606.5)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial Number 26,660, filed May 3, 1960, now U.S. Patent No. 3,046,313.

This invention relates to tris-[pentafluorophenyl]-phosphine and a method of making the same. The product is one of a family of compounds containing the pentafluorophenyl group. Compounds containing the pentafluorophenyl group are useful as intermediates or precursors for thermal-stable or fuel-resistant polymers or lubricating liquids.

An object of the invention is the preparation of tris-[pentafluorophenyl]-phosphine.

Other objects and many of the attendant advantages of this invention will be readily appreciated as the same becomes better understood by reference to the following detailed description.

The method of the invention includes the Grignard coupling or addition reaction. This and the Ullmann-type condensation are used to make other members of the family. The following scheme illustrates some of these reactions as applied to the making of tris-[pentafluorophenyl]-phosphine and other compounds of the family:

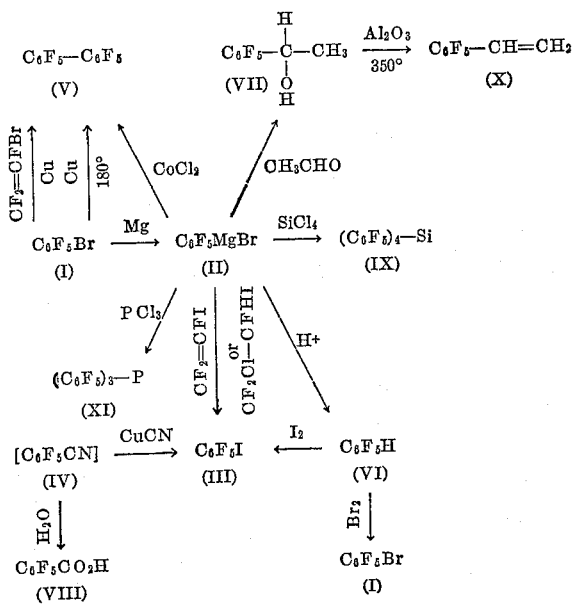

*Grignard reagent (II).*—A Grignard reagent for use in carrying out the Grignard coupling method of making perfluorodiphenyl is prepared in the following manner. To 1 g. (0.041 g. atom) of magnesium turnings in 10 ml. of anydrous ether is added 1 ml. of pentafluorobromobenzene (I) and a small crystal of iodine. Local heating is applied since it is necessary to initiate the reaction. When the reaction is sufficiently in progress, the flask containing the ingredients is cooled in an ice water bath and the remainder of the compound (I) (total 10 g., 0.04 mole) is added over a half-hour period. The Grignard solution is dark brown in color. When all the magnesium appears to be consumed, the solution is allowed to come to room temperature and is stirred for an additional half hour.

The compound of this invention is tris-[pentafluorophenyl]-phosphine.

To the aforedescribed Grignard reagent prepared, however, in this case from 30 g. (0.12 mole) of pentafluorobromobenzene and 3 g. (0.12 g. atom) of magnesium turnings in 0.75 ml. anhydrous ether is added dropwise 5.0 g. (0.037 mole) of phosphorus trichloride in 20 ml. of anhydrous ether. The flask is cooled in an ice-water bath. After the addition, the ice-bath is removed and the flask is allowed to stand at room temperature for 15 minutes. The solution is hydrolyzed with 40 ml. of cold dilute hydrochloric acid (10% by volume). The layers are separated and the acidic solution is extracted twice with 30 ml. portions of ether. The combined ether solution is dried over anhydrous calcium sulfate and concentrated under reduced pressure to give 13.1 g. of a dark brown solid. Sublimation under reduced pressure at 100° to 130° C. gives 8.5 g. (39.5%) of tris-[pentafluorophenyl]-phosphine, white needle-like crystals, M.P. 114° to 115° C. Oxidation of 2.0 g. (0.0037 mole) of the tris-[pentafluorophenyl]-phosphine can be carried out by refluxing the compound for 6 hours in a solution of 10 g. sodium dichromate, 25 ml. water, 10 ml. concentrated sulfuric acid, and 25 ml. glacial acetic acid. After neutralization of the acid solution and extraction with chloroform, 2 g. of fine white needle-like crystals of tris-[pentafluorophenyl]-phosphine oxide are obtained, M.P. 167° to 168° C.

Obviously many modifications and variations of the present invention are possible in the light of the above teachings. It is therefore to be understood that within the scope of the appended claim the invention may be practiced otherwise than as specifically described.

What is claimed is:

The process of making tris-[pentafluorophenyl]-phosphine which comprises reacting with phosphorus trichloride the Grignard reagent pentafluorophenylmagnesium bromide prepared from pentafluorobromobenzene.

References Cited in the file of this patent

UNITED STATES PATENTS 2,913,498   Ramsden _____ Nov. 17, 1959